(12) United States Patent  
Lauchner (10) Patent No.: US 7,025,430 B2  
(45) Date of Patent: Apr. 11, 2006

(54) BALL RETAINER FORWARD LOCKING ASSEMBLY

(75) Inventor: Craig Lauchner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 10/241,304

(22) Filed: Sep. 10, 2002

(65) Prior Publication Data

US 2004/0047678 A1    Mar. 11, 2004

(51) Int. Cl.  
*A47B 88/04*  (2006.01)

(52) U.S. Cl. ............................. 312/334.44; 312/334.11

(58) Field of Classification Search ............ 312/334.11, 312/334.15, 334.17, 334.25, 334.26, 334.33, 312/334.37, 334.38, 334.45, 330.1, 334.1, 312/334.7, 334.8, 334.16, 334.44, 334.46; 384/18

See application file for complete search history.

(56) References Cited

U.S. PATENT DOCUMENTS

| 3,186,772 | A | * | 6/1965 | Cohn | .......................... 384/18 |
| 3,904,254 | A | * | 9/1975 | Hagen et al. | .................. 384/18 |
| 5,671,988 | A | * | 9/1997 | O'Neill | .................. 312/334.44 |
| 6,145,945 | A | * | 11/2000 | Parvin | .................... 312/334.46 |
| 6,220,683 | B1 | * | 4/2001 | Chu | ...................... 312/334.44 |
| 6,379,045 | B1 | * | 4/2002 | Cirocco | ....................... 384/18 |
| 6,860,574 | B1 | * | 3/2005 | Hwang et al. | ......... 312/334.44 |

FOREIGN PATENT DOCUMENTS

GB            856227        * 12/1960      ............ 312/334.11

* cited by examiner

*Primary Examiner*—James O. Hansen (57) ABSTRACT

A ball retainer forward locking assembly for preventing movement of a ball retainer with respect to a slide. A first portion of a friction locking mechanism on the slide is removably coupled with a second portion of the friction locking mechanism on the ball retainer. The friction locking mechanism is adapted to provide a removably coupled friction lock between the ball retainer and the slide such that movement of the ball retainer with respect to the slide is minimized.

12 Claims, 5 Drawing Sheets

BALL RETAINER FORWARD LOCKING ASSEMBLY

TECHNICAL FIELD

The present claimed invention relates to the field of slide assemblies. More specifically, the present claimed invention relates to a ball retainer forward locking slide assembly.

BACKGROUND ART

Presently, slide assemblies are utilized as the mounting hardware between a component and a rack within which the component may be stored. For example, if the component is an electronic component such as a server, then the use of a rack allows for a plurality of servers to be utilized with efficiency of storage, and convenience of accessibility. In many cases, the rack may have a back panel to which the electronic components can connect, thereby allowing the components to receive their power connections, network connections, phone connections, and the like.

In general, the use of slide assemblies allows for a simple way to hold a component or plurality of components within the rack which also offers convenient access. In a telescoping slide assembly, a ball retainer is used to ensure that when the innermost slide is removed the balls remain in place within the slide assembly. That is, the balls do not fall out of the slide when the inner member is removed.

However, one deleterious effect of quick disconnect telescoping slide assemblies is that while the inner slide is removed from the slide assembly, the ball retainer is allowed to travel freely, thereby requiring a technician to correctly position the ball retainer prior to the installation or re-installation of the inner slide and any component mounted thereon. For example, when a technician inserts the inner slide into the slide assembly mounted with the rack, before the roller balls within the slide assembly may properly work to support the inner slide and allow for easier movement, the ball retainer must be correctly positioned in the front portion of the slide assembly. In addition, while supporting the weight of the component, while ensuring that the slide assembly is aligning itself correctly within the rack, and while disengaging the locking mechanism, the technician must also ensure the ball retainer stays in its forward most position.

Thus, during the installation process more than one person is needed to ensure correct installation is accomplished with a minimization of damage. For example, during the installation of a component, one technician may be needed to support the weight of the component, correctly align the slide assembly, and insert the component into the rack, while a second technician may be needed to disengage the locking mechanism and ensure the ball retainer is in the correct position. Both technicians would need to work in conjunction in order not to damage the rack, the slide assembly, components already in the rack, and/or the component being placed in the rack.

Thus, the utilization of the ball retainer during the installation process is not user friendly, is time-consuming, is cost associative, and lacks a desired "Design for Usability."

DISCLOSURE OF THE INVENTION

A ball retainer forward locking assembly for preventing movement of a ball retainer with respect to a slide is disclosed. In one embodiment, the present invention is comprised of a slide having a first portion of a locking mechanism. A second portion of the locking mechanism includes a ball retainer. The locking mechanism is adapted to provide a removably coupled locking connection between the ball retainer and the slide such that movement of the ball retainer with respect to the slide is minimized.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Figure 1A:
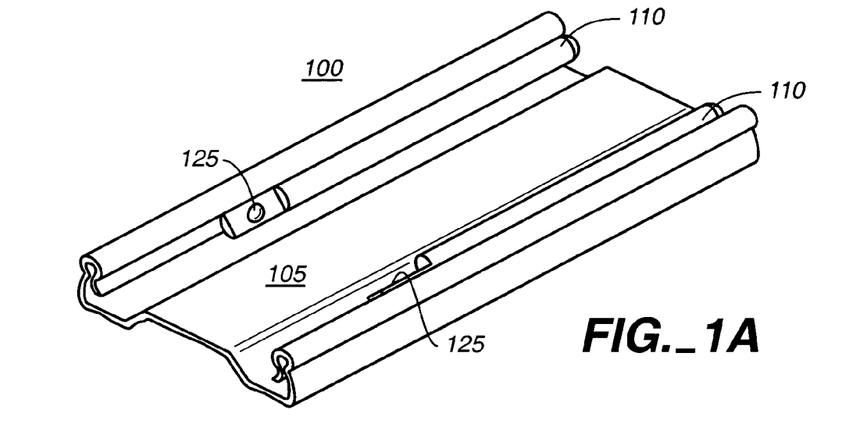
FIGS. 1A through 1C are perspective views of a slide portion of a ball retainer forward locking assembly in accordance with embodiments of the present claimed invention.
Figure 1B:
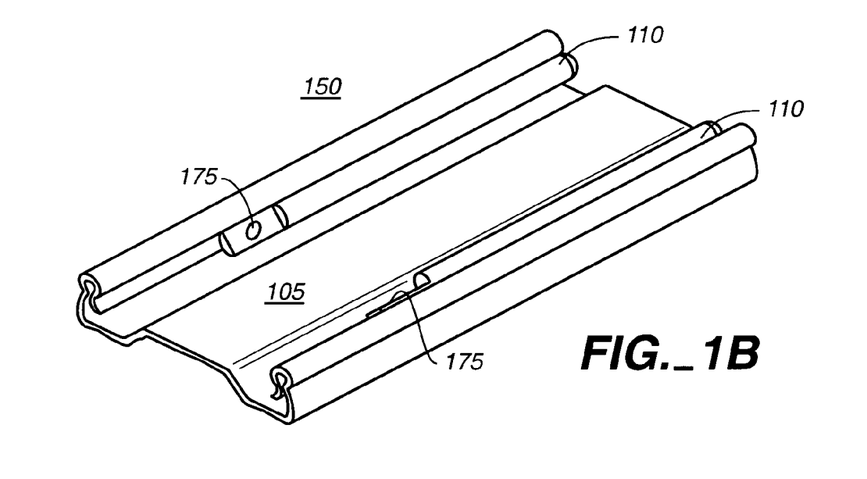
Figure 1C:
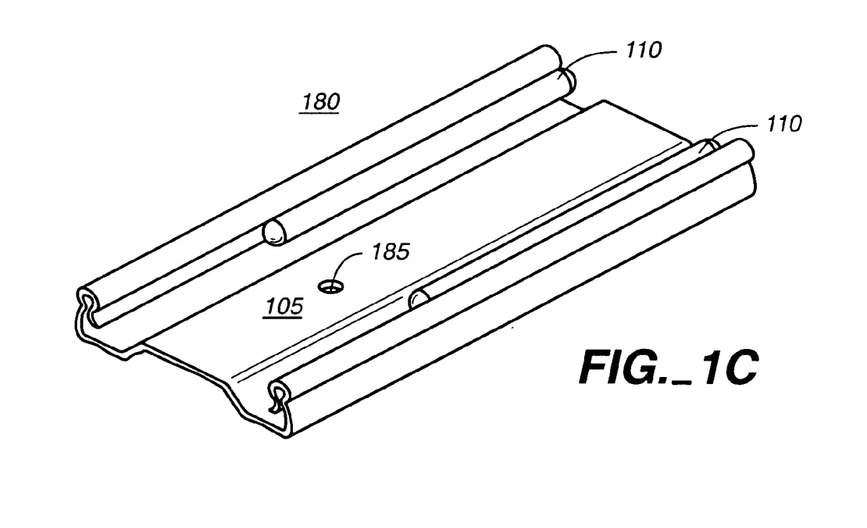

With reference now to FIGS. 1A through 1C, perspective views of a slide portion of a ball retainer forward locking assembly are shown in accordance with embodiments of the present claimed invention. The following discussion will begin with a detailed description of the physical characteristics of the present ball retainer forward locking assembly. The discussion will then contain a detailed description of the use and operation of the present ball retainer forward locking assembly.

In one embodiment, the location of the first portion of a locking mechanism on slide (or slide portion) 105 may be a dimple such as dimple 125 or a detent such as detent 175 on lead-in 110 as shown as shown in FIGS. 1A and 1B. In another embodiment (e.g., FIG. 1C), the location of the first portion of a locking mechanism on slide portion 105 may be a dimple (or detent) 185 in a location on slide portion 105 other than lead-in 110.

With reference still to FIGS. 1A through 1C, regarding the physical structure of the lead-in of a ball retainer forward locking assembly, in one embodiment, slide portion 105 may be a middle portion of a telescoping disconnect slide. In another embodiment, slide portion 105 may be an outer portion of a telescoping disconnect slide. Moreover, slide portion 105 includes lead-in 110 (or lead-ins 110). Importantly, as will be discussed in detail below, lead-ins 110 are further comprised of a first portion (e.g., 125 and 175) of a locking mechanism capable of reducing the motion of a ball retainer (e.g., ball retainer 210 of FIGS. 2A through 2C). Furthermore, first portion (e.g., 125 and 175) may be formed during the manufacture of lead-ins 110, or first portion (e.g., 125 and 175) may be formed on a pre-existing lead-in 110. In one embodiment, lead-in 110 may be made from acrylonitrile butadiene styrene (ABS), nylon, plastic, steel, stainless steel, or combinations thereof.

Figure 2A:
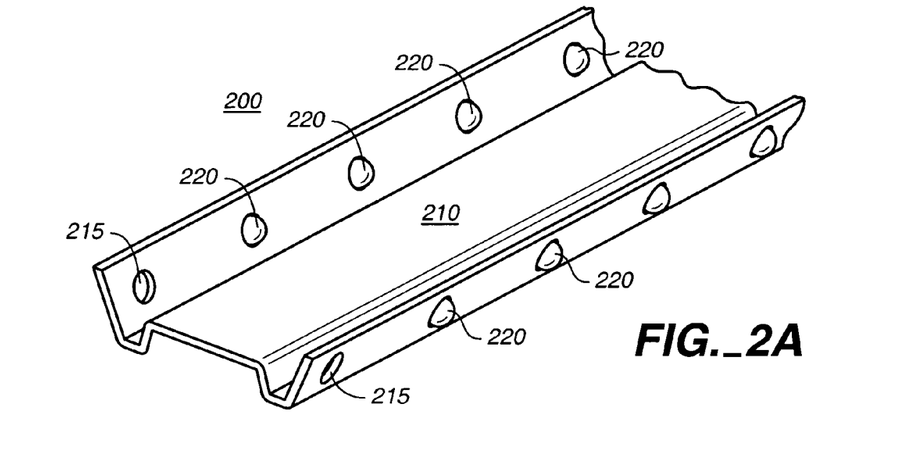
FIGS. 2A through 2C are perspective views of a ball retainer portion of a ball retainer forward locking assembly in accordance with embodiments of the present claimed invention.
Figure 2B:
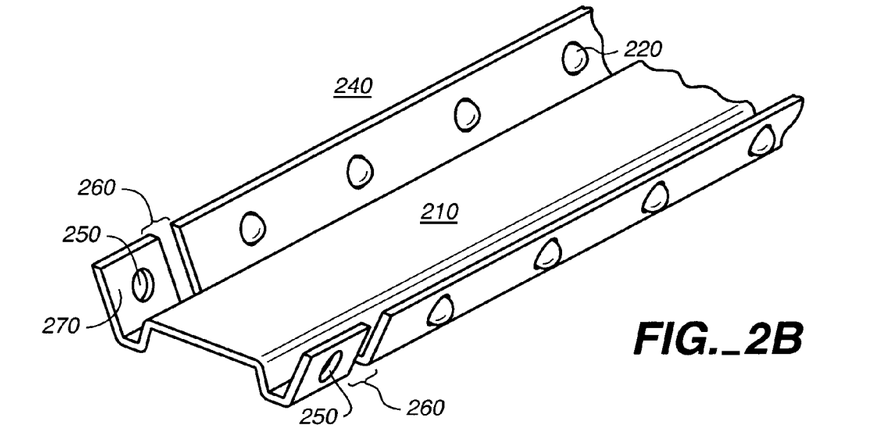
Figure 2C:
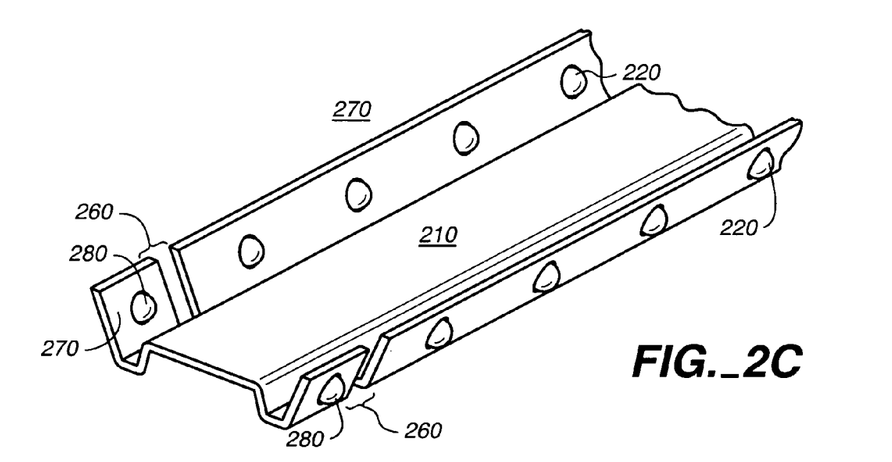

Referring still to FIGS. 1A through 1C, first portion (e.g., 125 and 175) of lead-in 110 is a portion of a locking mechanism capable of reducing the motion of a ball retainer (e.g., ball retainer 210 of FIGS. 2A through 2C). The locking mechanism is adapted to provide a removably coupled locking connection between lead-in 110 and the ball retainer (e.g., ball retainer 210 of FIGS. 2A through 2C), which will be discussed in more detail herein. In one embodiment (e.g., FIG. 1A), first portion 125 is a dimpled portion (e.g., a raised portion, lip, projection, prominence, or the like) integral with lead-in 110 and adapted to provide a removably coupled friction lock between lead-in 110 and the ball retainer. Although first portion 125 is shown as a circular dimpled portion in FIG. 1A, first portion 125 is also well suited to be formed in the shape of an oval, a square, a rectangle, or a randomly shaped dimpled portion. Furthermore, first portion 125 may be any sized protrusion from lead-in 110 that may be utilized in conjunction with the ball retainer (e.g., ball retainer 210 of FIGS. 2A through 2C) to provide a removably coupled locking connection.

In another embodiment (e.g., FIG. 1B), first portion 175 is a detent portion (e.g., a groove, divot, hole, dent, indentation, impression, concavity, or the like) integral with lead-in 110 and adapted to provide a removably coupled friction lock between lead-in 110 and the ball retainer. Although first portion 175 is shown as circular detent portion in FIG. 1B, first portion 175 is also well suited to be formed in the shape of an oval, a square, a rectangle, or a randomly shaped detent portion. Furthermore, first portion 175 may be any sized indention or hole within lead-in 110 that may be utilized in conjunction with the ball retainer (e.g., ball retainer 210 of FIGS. 2A through 2C) to provide a removably coupled locking connection.

With reference still to FIGS. 1A through 1C, in one embodiment lead-in 110 is fixedly mounted in a desired position on slide 105. For example, lead-in 110 may be molded with a push through tab, holes may then be punched through slide 105, and then the push through tabs may be slid through the holes in slide 105 and swaged on the outside of the slide. In one embodiment, lead-ins 110 may have two tabs which are pushed through slide 105 and swaged on the outside. The push through tabs are employed to correctly position lead-ins 110 with respect to slide 105, such that lead-ins 110 will maintain the desired position on slide 105. Although two mounting methods are mentioned herein, it is appreciated that the mounting method may be any method (e.g., glue, end caps, or the like) which maintain the desired position of lead-ins 110.

With reference now to FIGS. 2A through 2C, perspective views of a ball retainer portion of a ball retainer forward locking assembly are shown in accordance with embodiments of the present claimed invention. Regarding the physical structure of the ball retainer portion, for purposes of clarity, only one end of ball retainer portion (e.g., 210) is shown in FIGS. 2A through 2C. As will be discussed herein in detail, ball retainer 210 is comprised of ball 220 and, in one embodiment (e.g., FIG. 2A), a second portion (e.g., 215) of the locking mechanism. In another embodiment, as shown in FIG. 2B, ball retainer 210 may comprise a slot portion 260 which adds flexibility to ball retainer 210. Furthermore, ball retainer 210 may comprise a post slot portion 270 adapted to be removably coupled with lead-in 110. Ball retainer 210 may be manufactured from material such as plastic, stainless steel, plated steel, and spring steel. Although plastic, stainless steel, plated steel, and spring steel are mentioned herein, ball retainer 210 may be made of any material capable of retaining a shape and managing the location of ball 220.

With reference still to FIGS. 2A through 2C, the second portion of the locking mechanism (e.g., 215, 250, or 280) of ball retainer 210 may be either a detent portion or a dimple portion. For example, FIGS. 2A and 2B show a second portion (e.g., 215 and 250) integral with ball retainer 210, adapted to provide a removably coupled friction lock between ball retainer 210 and lead-in 110. Although second portions 215 and 250 are shown as circular detent portion, second portions 215 and 250 are also well suited to be an oval, square, rectangle, or randomly shaped detent portion. Furthermore, second portions 215 and 250 may be any sized indention or hole within ball retainer 210 that may be utilized in conjunction with the lead-in 110 to provide a removably coupled locking connection.

With reference now to FIG. 2C, the second portion of the locking mechanism (e.g., 280) of ball retainer 210 may be a dimpled portion integral with ball retainer 210, adapted to provide a removably coupled friction lock between ball retainer 210 and lead-in 110. Although second portion 280 is shown as circular dimpled portion in FIG. 2C, second portion 280 is also well suited to be an oval, square, rectangle, or randomly shaped dimpled portion. Furthermore, second portion 280 may be any sized protrusion from ball retainer 210 that may be utilized in conjunction with lead-in 110 to provide a removably coupled locking connection. For example, second portion 280 may be a ball which fits within the first portion of lead-in 110.

Figure 3A:
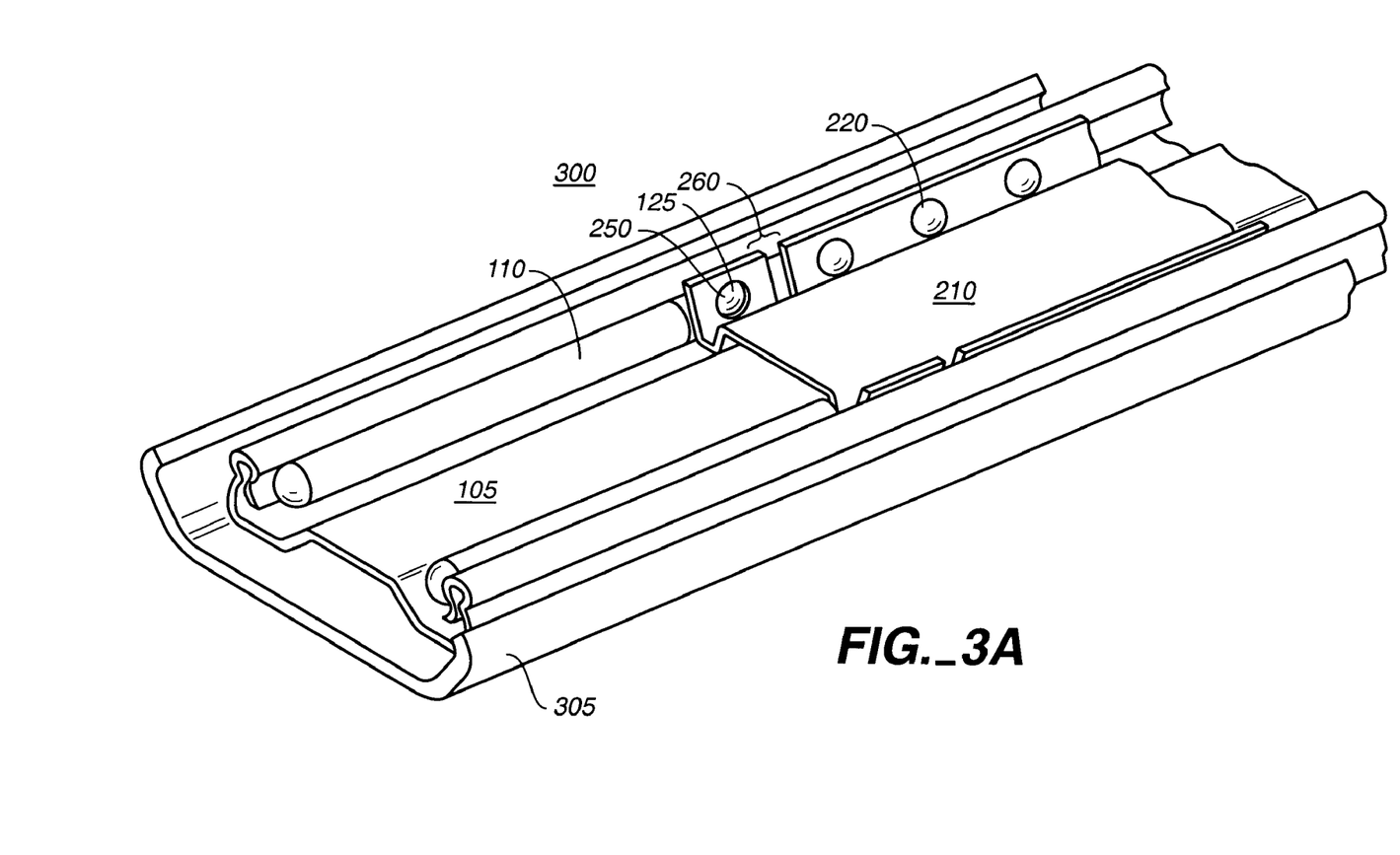
FIGS. 3A and 3B are perspective views of exemplary ball retainer forward locking assemblies in accordance with embodiments of the present claimed invention.
Figure 3B:
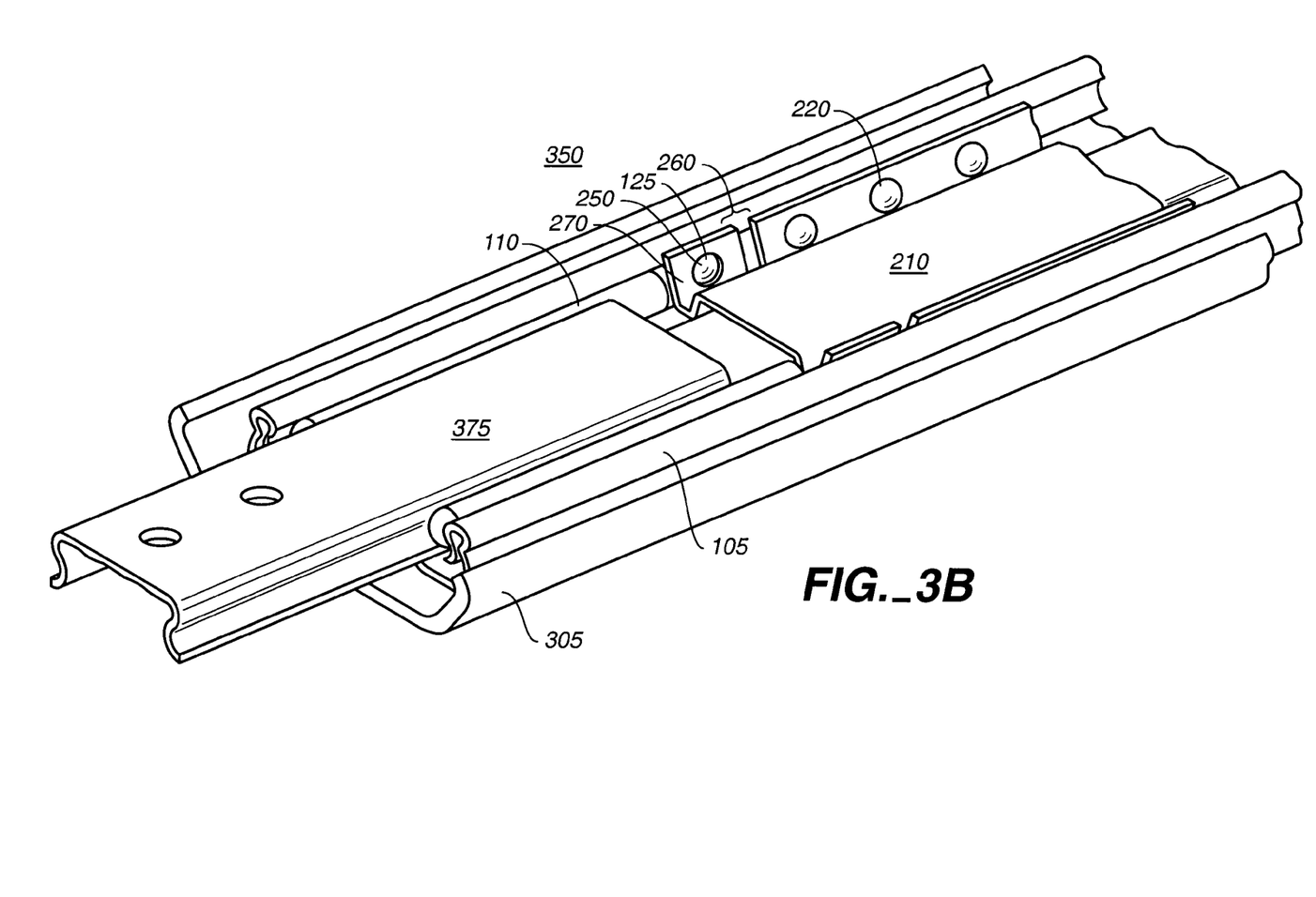

With reference now to FIGS. 3A and 3B, perspective views of exemplary ball retainer forward locking assemblies are shown in accordance with an embodiment of the present claimed invention. In general, FIG. 3A illustrates a removably coupled locking connection between lead-ins 110 and ball retainer 210. FIG. 3B also illustrates the removably coupled locking connection between lead-ins 110 and ball retainer 210. However, FIG. 3B further shows the insertion of inner slide member 375 into a telescoping disconnect slide assembly 350. For example, during an initial coupling of inner slide member 375 with telescoping disconnect slide assembly 350 the removably coupled locking connection maintains ball retainer 210 at a front portion of telescoping disconnect slide assembly 350. However, once inner slide member 375 engages with ball retainer 210, the friction between the two components will result in the locking connection being disengaged, and ball retainer 210 and ball 220 thereon will move in conjunction with inner slide member 375.

The following is a detailed description of the use and operation of the present one-motion installation slide assembly. With reference now to FIG. 3A, ball retainer 210 is removably coupled with lead-in 110. In one embodiment, ball retainer 210 and lead-in 110 may be coupled with slide 105 which may be either the outer slide (or the middle slide if a third slide is utilized (e.g., 305)) of a telescoping disconnect slide assembly. It is appreciated that only a portion of slide 105 and ball retainer 210 are shown in the present embodiments. It is further appreciated that most slide 105s will have the lead-ins 110 attached proximal to the end of the slide.

In one embodiment, slide assemblies 300 and 350 are utilized in conjunction with a rack and a component (e.g., a server) to be stored in the rack. For example, inner slide 375 of FIG. 3B may be removably coupled with the component to be stored in the rack. That is, inner slide 375 may be coupled to the side of the component (or the top, or the corner, or the like). In addition, slide 105 may be coupled to the rack (via mounting slide 105 directly to the rack or by mounting third slide 305 to the rack and having slide 105 coupled therein). While inner slide 375 is apart from slide assemblies 300 and 350, ball retainer 210 is held in a forward position via the removably coupled locking connection. For example, ball retainer 210 is held in the forward position due to a friction lock with lead-in 110. Once inner slide 375 enters the rack and establishes contact with ball retainer 210, ball retainer 210 is then decoupled from lead-in 110 due to the friction generated by the insertion of inner slide 375 into slide assembly 300 or 350. Therefore, ball retainer 210 is free to travel in conjunction with inner slide 375 allowing the smoother motion thereof. Although the decoupling of ball retainer 210 from lead-in 110 is mentioned as being due to friction, the decoupling of the lock between lead-in 110 and ball retainer 210 may be due to direct contact, a catch, or the like.

Referring still to FIG. 3B, the present embodiment maintains the location of ball retainer 210 during the initial coupling of the inner slide 375 with slide 105. Therefore, during the installation process (e.g., inner slide 375 into slide 105), relocation of ball retainer 210 is not necessary. In addition, the present embodiment does not require a user or technician to manually set the removably coupled locking connection after the removal of inner slide 375. Instead, the present embodiment allows customers and technicians to realize the beneficial assembly requirements of a ball retainer forward lock which automatically engages during removal of inner slide 375.

With reference still to FIG. 3B, slide assembly 350 is shown upon initial installation of inner slide 375, wherein the removably coupled locking connection between second portion 215 and ball retainer 210 is engaged. Specifically, ball retainer 210 is locked in a forward position. In one embodiment, ball retainer 210 is locked via a dimpled portion 125 of lead-in 110, mating with a detent portion 250 of ball retainer 210. For example, detent portion 250 slid over dimpled portion 125 and is then held in place by dimpled portion 125. In one embodiment, slot 260 is utilized to give enough flex to post slot portion 270 to allow detent portion 250 to slide over dimpled portion 125. In another embodiment, ball retainer 210 is locked via a detent portion 125 of lead-in 110, mating with a dimpled portion 250 of ball retainer 210. Although slot 260 is utilized in one embodiment, the present invention is well suited to a ball retainer such as ball retainer 210 which does not have a slot 260.

Once inner slide portion 375 makes initial contact with ball retainer 210, as stated herein, the removably coupled locking connection between ball retainer 210 and second portion 215 is released. For example, slot 260 allows detent portion 250 to pass over dimpled portion 125. Therefore, ball retainer 210 slides freely along with inner slide 375 during the installation. When inner slide 375 begins to be removed from slide assembly 350, ball retainer 210 slides freely toward the front of slide assembly 350. When inner slide 375 is completely removed, detent portion 250 will slide over dimpled portion 125 and will be held in place by dimpled portion 125. Therefore, ball retainer 210 will be locked in the correct location for the future insertion of an inner slide 375. Furthermore, when a user or technician prepares to reinstall inner slide 375, the relocation of ball retainer 210 is not necessary, nor is the need for anyone to maintain the forward location of ball retainer 210 during the installation process.

Figure 4:
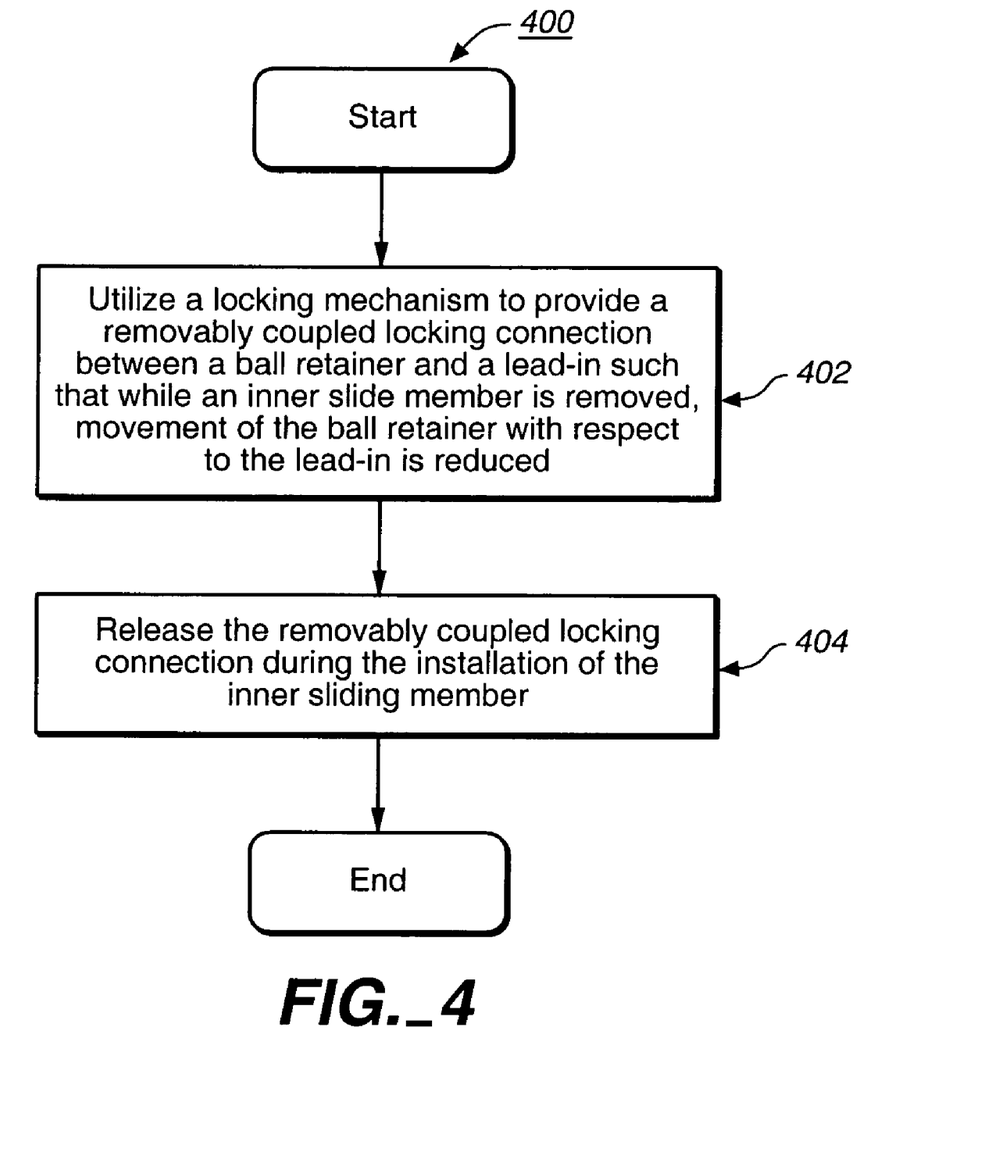
FIG. 4 is a flow chart of steps performed in accordance with one embodiment of the present claimed invention.

With reference now to FIG. 4, a flow chart 400 summarizing the steps performed in accordance with one embodiment of the present invention is shown. At step 402, the present embodiment utilizes a locking mechanism to provide a removably coupled locking connection between a ball retainer (e.g., ball retainer 210 of FIG. 3B) and a lead-in (e.g., lead-in 110 of FIG. 3B) such that while an inner slide member (e.g., inner slide 375 of FIG. 3B) is removed, movement of the ball retainer with respect to the lead-in is minimized. As described in detail herein, the removably coupled locking connection (e.g. dimpled portion 125 and detent portion 250) is adapted to maintain the location of the ball retainer such that during installation, a further step of monitoring and adjusting the location of the ball retainer is not required.

Next, at step 404, the present embodiment releases the removably coupled locking connection during installation of an inner slide member. Beneficially, the present embodiment eliminates the need to manually release the locking mechanism between the ball retainer (e.g., ball retainer 210 of FIG. 3B) and the lead-in (e.g., lead-in 110 of FIG. 3B). Instead, the present embodiment allows slide assemblies to be assembled without concern for the subsequent unlocking of the connection between ball retainer 210 and lead-in 110. Furthermore, with the ability to remove and mount both ball retainer 210 and lead-in 110 on pre-existing slide assemblies the need for replacement of slide assemblies already in use is negated.

Thus, embodiments of the present invention provide a ball retainer forward locking assembly method and apparatus which maintains the ball retainer in a forward position during installation. The ball retainer forward locking assembly method and apparatus achieves the above accomplishment and also provides a reliable release mechanism for the ball retainer when the inner slide is being inserted into the slide assembly while also significantly reducing assembly procedures and personnel requirements. In addition, it can be adapted to readily interface with industry standard components and meet industry standard specifications.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A telescoping disconnect slide assembly comprising:
a first slide portion comprising:

an upper channel and a lower channel for an upper ball bearing and a lower ball bearing, respectively; and an upper lead-in structure and a lower lead-in structure, interior to and not protruding from said upper and lower channels, wherein said lead-in structures are coupled with said upper and lower channels, respectively, proximal to an end of said first slide portion, and wherein said lead-in structures comprise an upper first portion of a friction locking mechanism and a lower first portion of a friction locking mechanism, respectively;

a second slide portion; and a ball retainer comprising:

an upper second portion of said friction locking mechanism;

an upper opening for retaining said upper ball bearing;

a lower second portion of said friction locking mechanism;

a lower opening for retaining said lower ball bearing, wherein said upper and lower openings are collinear with said upper and lower second portions of said locking mechanism and are respectively separated from said upper and lower second portions of said friction locking mechanism by an upper slot portion and a lower slot portion, wherein removal of said second slide portion simultaneously engages said upper and lower first and second portions of said locking mechanism in removably coupled friction locking connections and installation of said second slide portion disengages said removably coupled friction locking connections.

2. The disconnect slide assembly of claim 1 wherein said first portions of said friction locking mechanism comprise dimpled portions and said second portions of said friction locking mechanism comprise detent portions, said detent portions adapted to provide said removably coupled friction locking connection.

3. The disconnect slide assembly of claim 1 wherein said first portions of said friction locking mechanism comprise detent portions and said second portions of said friction locking mechanism comprise dimpled portions, said dimpled portions adapted to provide said removably coupled friction locking connection.

4. The disconnect slide assembly of claim 1 wherein said first slide portion is an outer slide portion, and said second slide portion is an inner slide portion.

5. The disconnect slide assembly of claim 1 wherein said first portions of said friction locking mechanism comprise holes and said second portions of said friction locking mechanism comprise detent portions, wherein said detent portions are adapted for locking within said holes.

6. The disconnect slide assembly of claim 1 wherein said first portions of said friction locking mechanism comprise dimpled portions and said second portions of said friction locking mechanism comprise holes, wherein said dimpled portions are adapted for locking with said holes.

7. A method for restricting movement of a ball retainer in a telescoping disconnect slide assembly, wherein said telescoping disconnect slide assembly comprises:

a first slide portion comprising:

an upper and a lower channels for an upper and a lower ball bearings wherein said channels are parallel to a direction of telescoping action; and an upper and a lower lead-in structures interior to and not protruding from said upper and lower channels, wherein said lead-in structures are coupled with said upper and lower channels, respectively, proximal to an end of said first slide portion, wherein said lead-in structures comprise an upper and a lower first locking portions of a friction locking mechanism, respectively;

a second slide portion; and a ball retainer comprising:

an upper and a lower second locking portions of said friction locking mechanism;

an upper and a lower openings for retaining said upper and lower ball bearings, respectively, wherein said upper and lower openings are collinear with said upper and lower second locking portions of said locking mechanism, respectively, in said direction of telescoping action, and wherein said openings are separated from said second locking portions of said locking mechanism by an upper and a lower slot portions, respectively, wherein said slot portions are perpendicular to said direction of telescoping action, and wherein said slot portions enable said ball retainer to engage in and disengage from a removably coupled friction locking connection; said method comprising:

removing said second slide portion from said telescoping disconnect slide assembly, wherein said removal of said second slide portion engages said first and second locking portions of said friction locking mechanism in said removably coupled locking connection; and inserting said second slide portion into said telescoping disconnect slide assembly, wherein said insertion of said second slide portion disengages said removably coupled locking connection.

8. The method of claim 7, wherein said first locking portions are dimples and said second locking portions are detents.

9. The method of claim 7, wherein said first locking portions are detents and said second locking portions are dimples.

10. The method of claim 7, wherein said first slide portion is an outer slide portion, and said second slide portion is an inner slide portion.

11. The method of claim 7 wherein said first locking portions are holes and said second locking portions are detents for locking said detents with said holes.

12. The method of claim 7 wherein said first locking portions are dimples and said second locking portions are holes for locking said dimples with said holes.

* * * * *

UNITED STATES PATENT AND TRADEMARK OFFICE
CERTIFICATE OF CORRECTION

PATENT NO.        : 7,025,430 B2                                          Page 1 of 1
APPLICATION NO. : 10/241304
DATED             : April 11, 2006
INVENTOR(S)       : Craig Lauchner It is certified that error appears in the above-identified patent and that said Letters Patent is hereby corrected as shown below:

In column 7, line 32, in Claim 2, after "The" insert -- telescoping --.

In column 7, line 38, in Claim 3, after "The" insert -- telescoping --.

In column 7, line 44, in Claim 4, after "The" insert -- telescoping --.

In column 7, line 47, in Claim 5, after "The" insert -- telescoping --.

In column 7, line 52, in Claim 6, after "The" insert -- telescoping --.

Signed and Sealed this

Twenty-eighth Day of July, 2009

JOHN DOLL
*Acting Director of the United States Patent and Trademark Office*